UNITED STATES PATENT OFFICE.

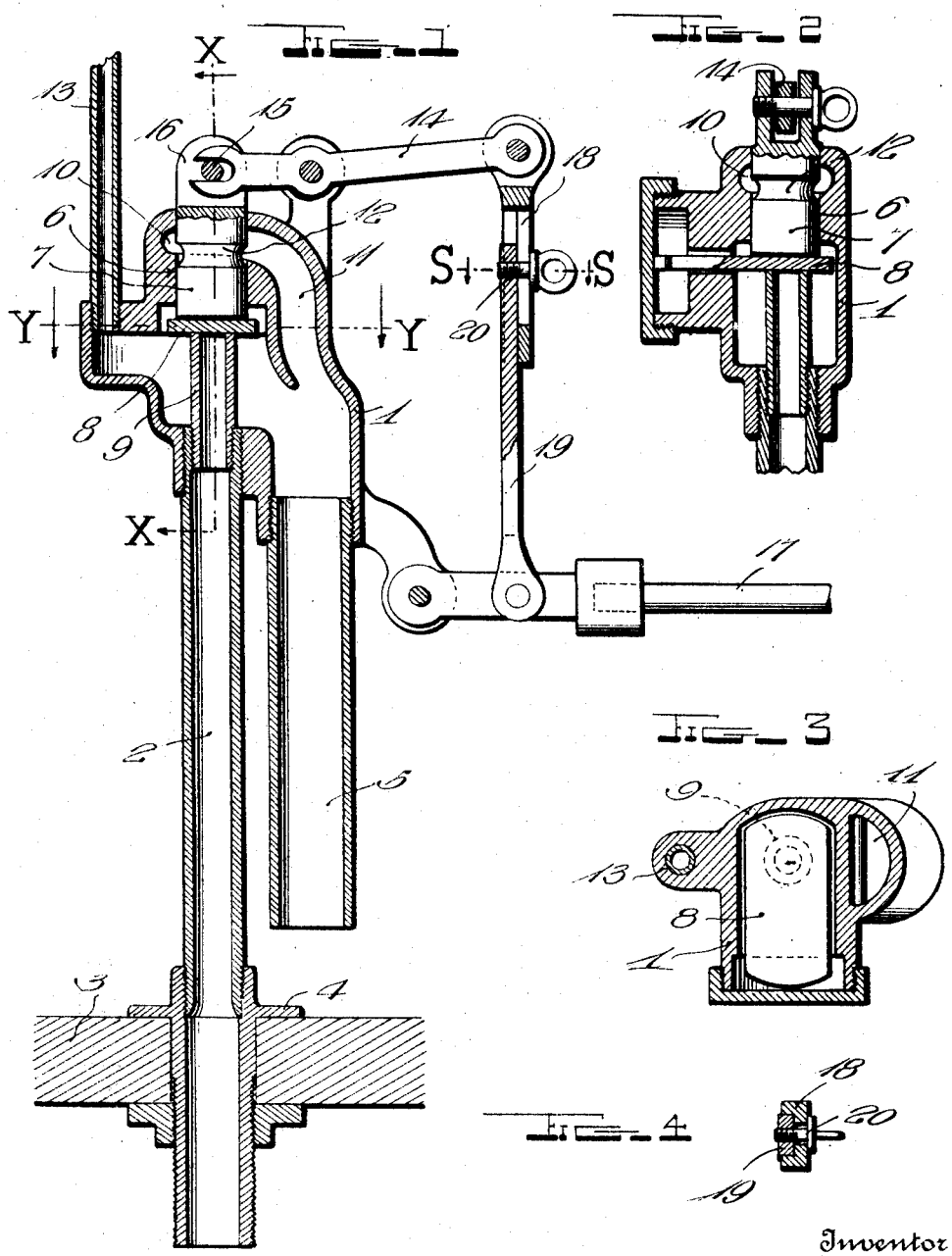

HENRY GARDENIER, OF PATERSON, NEW JERSEY.

WATER-SUPPLY VALVE.

1,365,906.  Specification of Letters Patent.  Patented Jan. 18, 1921.

Application filed January 26, 1920. Serial No. 354,305.

*To all whom it may concern:*

Be it known that I, HENRY GARDENIER, a citizen of the United States, residing at Paterson, in the county of Passaic and State of New Jersey, have invented certain new and useful Improvements in Water-Supply Valves; and I do declare the following to be a full, clear, and exact description of the invention, such as will enable others skilled in the art to which it appertains to make and use the same.

This invention relates to water supply valves, being especially designed for use in connection with flush tanks, cisterns, or any other container where refilling or control of the water to maintain a predetermined level is necessary.

The principal object of the invention is to provide a valve of the above mentioned type which is an improvement on a similar valve, shown and described in my Patent No. 924,052, granted to me on June 8, 1909.

One of the differences between the present device, and my patented device, is the novel construction of levers which are designed to actuate the valve, the same being adjustable to control the seating of the valve according to the amount of water supplied to the tank.

Another difference and advantage between the construction shown in this application, and that provided in my patented device is the different design of valve casing, the present device being provided with a guide bore in which the plunger is fitted and adapted to slide, the casing also being provided with a passage communicating with the bore to cause any water that leaks upwardly between the plunger and the wall of the guide bore, to escape through the passage and hence from the casing by means of an outlet pipe.

Other objects and differences of construction will be apparent during the course of the following description.

In the accompanying drawings forming a part of this specification and in which like numerals are employed to designate like parts throughout the same, Figure 1 is a vertical sectional view, partly in elevation of a device constructed in accordance with my invention.

Fig. 2 is a sectional view, partly in elevation, taken on approximately the plane of the line X—X of Fig. 1.

Fig. 3 is a view taken on the plane of the line Y—Y of Fig. 1.

Fig. 4 is a transverse section on the plane of the line S—S of Fig. 1.

Like all other valves of this type, my valve comprises a valve casing 1 of any desired shape or design, which is provided at its bottom with an inlet or supply pipe 2, which also serves to support it. This supply pipe 2 is secured to the bottom of the flush tank 3 by means of a spud 4, in the manner shown, although it may be secured thereto in any other way. Water escapes from the valve casing by means of a hush-tube or outlet 5. The valve casing is provided with a bore 6, which I will term a valve guide bore, in which a plunger 7 is fitted and adapted to reciprocate. This plunger coacts with a flexible packing 8 which is disposed between it and the valve seat 9. The so called packing 8 is in the form of a tongue, which is in effect a flap valve which is unseated by the inflowing water, and is retained in closed position by means of the plunger 7 which coacts with the valve.

I desire it to be understood that features and advantages of this specially constructed packing are clearly set forth in the description of my aforesaid patent, and it is therefore deemed unnecessary to set forth these advantages in this description.

In a great many valves of this type, packing or cups are employed to prevent the water from spurting up around the plunger and, as before stated, it is one of the objects of this invention to obviate the necessity of employing such packing or cups which are difficult to replace; by providing the guide bore 6 between its ends with a circumferential groove 10, which forms a water space with which the water passage 11 communicates, and by means of which the water is caused to flow from the casing out of the tube 5. The plunger 7 is provided intermediate its ends with a circumferential groove 12 which is normally in communication with the groove 10, thus forming a water space of sufficient size. With this construction it will be seen that any water which may force its way upwardly between the plunger 7 and the wall of the guide opening 6, will reach the water space formed by the grooves 10 and 12, and will be drawn by suction downwardly through the passage 11, and will escape by means of the pipe 5. A common form of re-fill tube 13 may be connected to the casing if desired, according to the type of the valve structure.

The plunger 7 will be actuated by a novel arrangement of levers, which are of such construction that they will be arranged to be actuated by the water which flows into the tank. One of the levers 14 is pivoted intermediate its ends on the valve casing in the manner shown. If desired, one end of this lever may be forked as shown, to straddle the pin 15 disposed between spaced ears 16 which are a part of the plunger 7. This construction permits these parts to be readily disconnected, and also forms the desired pivotal connection. Pivotally mounted on the casing 1 in any suitable manner is a float carrying, horizontally disposed arm 17, the action of which is controlled by the amount of water contained in the tank. Pivotally connected to arm 17 and also connected to the lever 14 is a vertically adjustable connection, which is designed to permit the float carrying arm to be adjusted up or down to vary the action of the plunger 7 according to the amount of water supplied to the flush tank. Adjustability of this connection may be accomplished in any desired manner, however, I have shown this connection as including a substantially channel shaped part 18 which is carried by lever 14, and a bar 19 which is carried by the arm 17, and which is freely slidable in the channel member 18. This channel member is provided in one place with an elongated slot and the bar 19 carries a binding-screw 20 which projects through the slot, and is provided with a circular flange to bind against the edges of the slot to retain the parts in any desired position. When the float arm moves down sufficiently far, it will slide the plunger 7 upwardly, whereupon water entering the pipe 2 will lift the flap valve 8 and permit the water to fill the tank. Now, as soon as the water in the tank becomes sufficiently high the float arm will be raised to a position to close the valve. By turning the screw 20 the float arm may be adjusted up or down to control the action of the plunger according to the amount of water desired to be supplied to the flush tank.

The foregoing description fully describes the construction and coöperation of the various parts of the valve, therefore, further description along this line is deemed unnecessary. However, I desire to call attention to the fact that a valve in accordance with my invention possesses many advantageous features, and is superior in a great many ways to any valve of similar construction with which I am thoroughly acquainted. For instance, the economical form of packing more particularly described in my aforesaid patent is exeremely useful with valves of this type, and the manner in which I prevent water from escaping from the casing between the plunger and the casing is also advantageous. The construction of my valve is such, that access may be readily had to all parts thereby permitting them to be readily removed and replaced with new parts. In manufacturing, the construction of the various parts is such that they are extremely easy to assemble. The valve too, is reliable in operation.

From the foregoing description taken in connection with the accompanying drawing, it is believed that the operation, construction of the various parts, features and advantages of the device are obvious, therefore further description is deemed unnecessary.

It is to be understood that the form of the invention herein shown and described is to be taken as a preferred form of the same, and that various minor changes in the shape, size, and arrangement of parts may be resorted to without departure from the spirit of the invention or the scope of the subjoined claim.

I claim:

A flush tank valve comprising a supply pipe, a casing at the upper end of the same, provided in its top with an opening, adjacent to which are upwardly extending spaced ears, being also provided below the latter and on the same side with downturned spaced ears, a valve seat in the casing, a valve for coaction with the seat, a plunger for actuating the valve, the same extending through the opening in the casing and beyond the latter, the extended portion of the plunger being in the form of spaced lugs, a pin extending between and secured to the lugs, a forked lever fulcrumed intermediate its ends between the first named ears, the fork thereof straddling said pin, a float carrying arm pivoted between the downturned ears, a vertically extending flat bar pivoted at its lower end to said arm adjacent the pivoted end of the latter, being provided at its upper end with a screw-threaded aperture, a slotted channel member pivoted to the opposite end of the aforesaid lever, the bar being slidable therein, and a headed binding screw passing through the slot in said member and through the aperture in said bar, the head thereof engaging the edges of the slot to retain the bar in a set position.

In testimony whereof I have hereunto set my hand.

HENRY GARDENIER.